(12) United States Patent
Narendra et al.

(10) Patent No.: US 9,148,405 B2
(45) Date of Patent: *Sep. 29, 2015

(54) CLIENT DEVICE TOKEN BASED MULTIFACTOR AUTHENTICATION

(71) Applicant: Tyfone, Inc., Portland, OR (US)

(72) Inventors: Siva G. Narendra, Portland, OR (US); Donald Allen Bloodworth, Camas, WA (US); Todd Raymond Nuzum, Omaha, NE (US)

(73) Assignee: Tyfone, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,073

(22) Filed: Jan. 28, 2015

(65) Prior Publication Data

US 2015/0143457 A1 May 21, 2015

Related U.S. Application Data

(63) Continuation of application No. 14/289,901, filed on May 29, 2014, now Pat. No. 9,055,029, which is a continuation of application No. 13/036,774, filed on Feb. 28, 2011, now Pat. No. 8,745,709.

(51) Int. Cl.
*G06F 7/04* (2006.01)
*H04L 29/06* (2006.01)

(52) U.S. Cl.
CPC .......... *H04L 63/0227* (2013.01); *H04L 63/083* (2013.01); *H04L 63/0853* (2013.01); *H04L 63/105* (2013.01); *H04L 63/20* (2013.01); *H04L 63/0281* (2013.01); *H04L 2463/082* (2013.01)

(58) Field of Classification Search
CPC .............. H04L 63/105; H04L 63/0853; H04L 63/0281; H04L 2463/082
See application file for complete search history.

(56) References Cited

U.S. PATENT DOCUMENTS

| 6,711,681 | B1 | 3/2004 | Al-Salqan et al. |
| 8,612,759 | B2 * | 12/2013 | Ishimoto ....................... 713/168 |
| 2003/0074585 | A1 | 4/2003 | Charbonneau |
| 2003/0120957 | A1 | 6/2003 | Pathiyal |
| 2007/0022299 | A1 | 1/2007 | Yoshimura |
| 2007/0169174 | A1 | 7/2007 | Critten et al. |
| 2007/0186106 | A1 | 8/2007 | Ting et al. |
| 2008/0072061 | A1 | 3/2008 | Cannon et al. |
| 2008/0301791 | A1 | 12/2008 | Smith et al. |
| 2009/0049307 | A1 | 2/2009 | Lin |
| 2009/0320118 | A1 | 12/2009 | Mueller et al. |

OTHER PUBLICATIONS

Ayu Tiwari, Sudip Sanyal, Ajith Abraham, Svein Johan Knapskog, Sugata Sanyal, "A Multi-Factor Security Protocol for Wireless Payment—Secure Web Authentication Using Mobile Devices" Indian Institute of Information Technology (IiIT).
U.S. Appl. No. 14/289,901 Office Action dated Jul. 17, 2014, 12 pages.

* cited by examiner

*Primary Examiner* — Amir Mehrmanesh
(74) *Attorney, Agent, or Firm* — Dana B. LeMoine

(57) ABSTRACT

A multifactor authentication (MFA) enforcement server provides multifactor authentication services to users and existing services. During registration, the MFA enforcement server changes a user's password on an existing service to a password unknown to the user. During normal usage when the user accesses the existing service through the MFA enforcement server, the MFA enforcement server enforces a multifactor authentication enforcement policy.

18 Claims, 7 Drawing Sheets

USER INFO
    -CONTACT
    -TOKEN IDENTITY
    -CHALLENGE QUESTION

APPLICATIONS REGISTERED
    netpeoplesite.com
        -USERNAME
        -PASSWORD
            -KNOWN TO USER
            -NOT KNOWN TO USER
        -MFA POLICIES
    bankingdebitcredit.com
        -USERNAME
        -PASSWORD

MFA POLICIES    (PER APPLICATION)

| MFA LEVELS | R/W | POSTS VISIBLE | USER DEFINED CONTENT FILTERING |
|---|---|---|---|
| TOKEN PRESENT | ☐ | ☐ | ☐ |
| CHALLENGE QUESTION | ☐ | ☐ | ☐ |
| OTHER | ☐ | ☐ | ☐ |
| NO MFA | ☐ | ☐ | ☐ |

*FIG. 5*

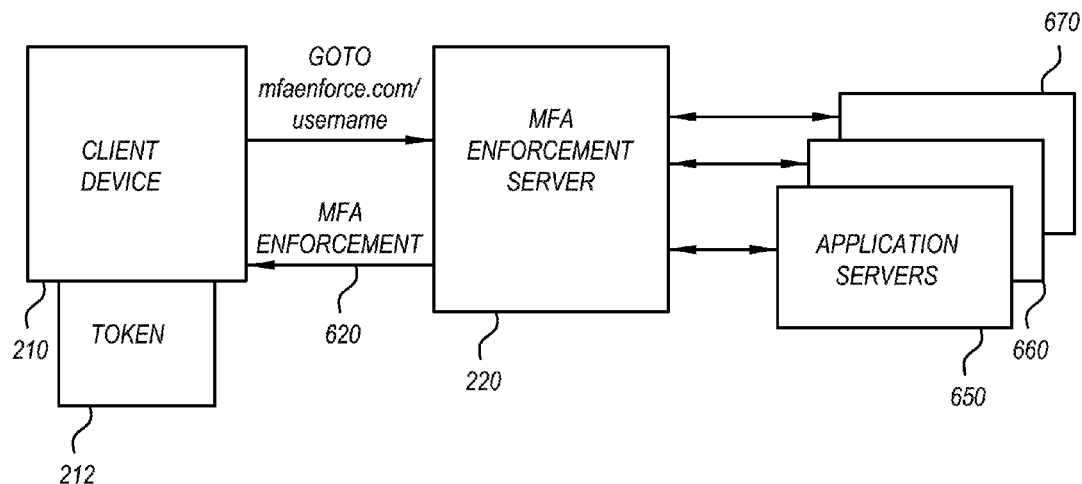
FIG. 6
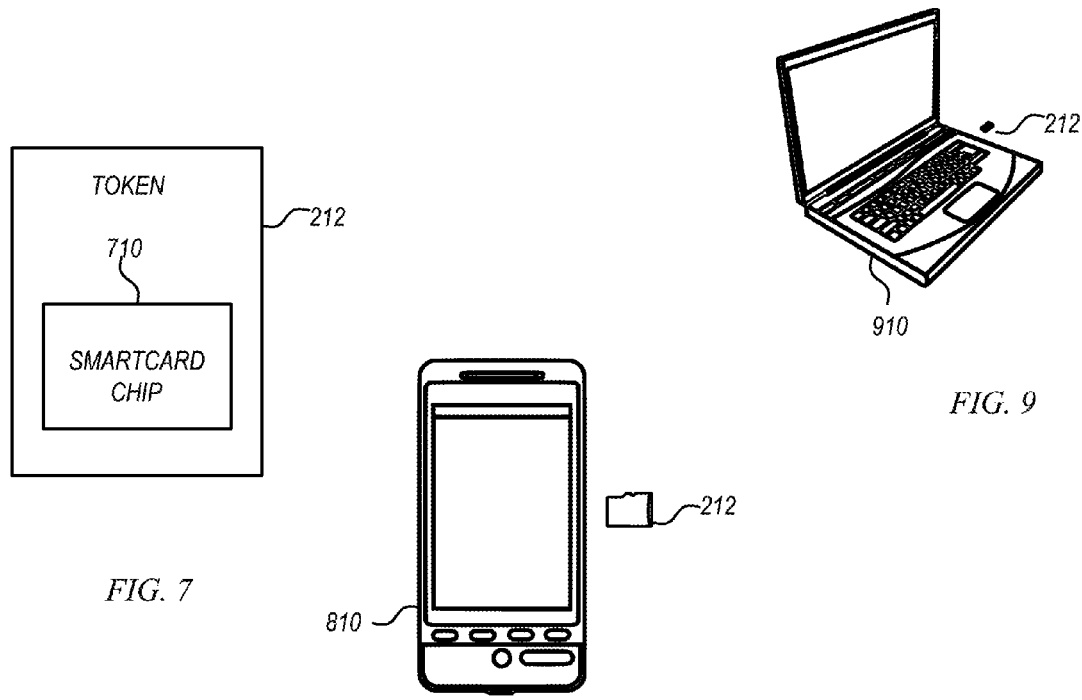
FIG. 7
FIG. 8
FIG. 9

CLIENT DEVICE TOKEN BASED MULTIFACTOR AUTHENTICATION

FIELD

The present invention relates generally to authentication, and more specifically to multifactor authentication.

BACKGROUND

Computer systems typically "authenticate" users prior to allowing access. For example, a desktop computer may authenticate a user with a username and password. When the user provides the correct username and password, the user is "authenticated" and is allowed access to computer resources.

FIG. 1 shows a prior art system with user authentication. A user wishing to gain access to an existing service 120 operates a client device 110. The client device 110 may be any type of user equipment (e.g., a laptop computer with a web browser, or a mobile phone). Existing service 120 is shown as a social networking website with the domain name of "www.netpeoplesite.com." This fictitious social networking website name is used herein to represent any existing service to which a user may wish to gain access. To gain access to the existing service, the user enters the domain name for netpeoplesite.com in a web browser on client device 110. In response, the existing service 120 prompts for credentials such as a username and password. If the user correctly provides both the username and password, then the existing service 120 authenticates the user and authorizes the user to access all content. If the user fails to correctly provide both the username and password, then the existing service 120 denies access and allows the user to retry entering the username and password.

BRIEF DESCRIPTION OF THE DRAWINGS

FIG. 5 shows user information and MFA policy definition data in accordance with various embodiments of the present invention;

FIG. 6 shows an MFA enforcement server providing authentication intermediary services for multiple existing services;

FIG. 7 shows an MFA token in accordance with various embodiments of the present invention;

FIGS. 8 and 9 show MFA tokens in use with various client devices;

DESCRIPTION OF EMBODIMENTS

Figure 1:
FIG. 1 shows a prior art system with user authentication.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
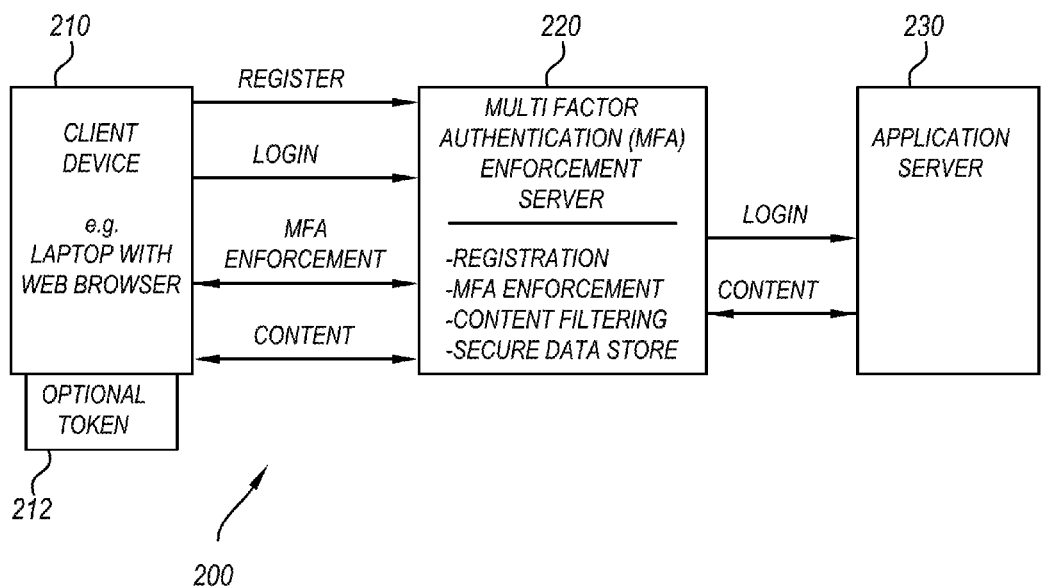
FIG. 2 shows a system with a multifactor authentication (MFA) enforcement server.

FIG. 2 shows existing service 120, client device 210 with optional token 212, and multifactor authentication (MFA) enforcement server 220. In some embodiments, MFA enforcement server 220 serves as an authentication intermediary between existing service 120 and client device 210, and enforces a multifactor authentication policy when a user of client device 210 wishes to be authenticated to existing service 120. As used herein, the term "multifactor authentication policy" refers to an authentication policy that grants or restricts access to one or more resources based on differing levels of authentication. For example, an MFA policy may grant access to all available services when a user satisfies multiple factors of authentication (e.g., username, password, and physical presence of token). Also for example, an MFA policy may restrict access to one or more available services if less than all possible authentication factors are satisfied.

In operation, a user registers with MFA enforcement server 220 to define the MFA policy to be applied in the future. The MFA policy may include enforcement of any number or type of authentication factors (e.g., challenge questions, physical presence of token, out-of-band factors such as SMS or return phone call, etc.). In addition, the MFA policy may map different levels of authentication to different levels of content access through content filtering. For example, if a user can satisfy a subset of the authentication factors, then the MFA policy may allow authentication of the user while restricting access to some content. In this manner, MFA enforcement server 220 may act as both a content intermediary as well as an authentication intermediary between existing service 120 and client device 120.

After registration is complete, the user logs in to the existing service 120 through MFA enforcement server 220. During the login process, MFA enforcement server 220 enforces one or more MFA policies defined during registration. For example, if an MFA policy includes checking for the presence of a physical token, then MFA enforcement server may detect the presence of optional token 212 prior to allowing authentication. If the MFA policy is satisfied, then MFA enforcement server 220 logs in to existing service 120 on behalf of the user. In some embodiments, MFA enforcement server 220 also filters content (unidirectionally or bidirectionally) according to the MFA policy in effect.

Figure 3:
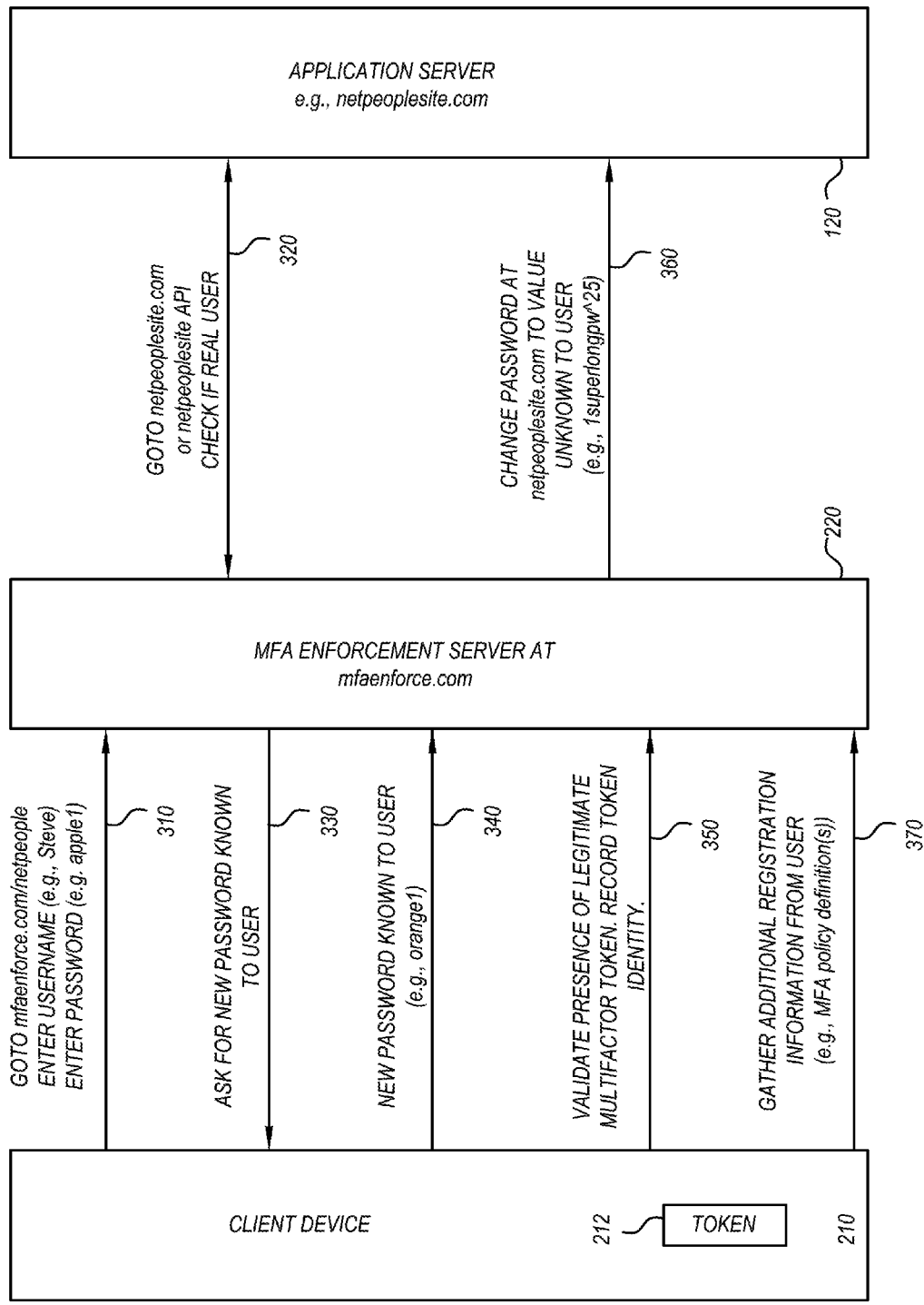
FIG. 3 shows communication flow during registration with a multifactor authentication enforcement server in accordance with various embodiments of the present invention.

FIG. 3 shows communication flow during registration with a multifactor authentication enforcement server in accordance with various embodiments of the present invention. MFA enforcement server 220 is shown in FIG. 3 as having a separate domain "mfaenforce.com"; however this is not a limitation of the present invention. As described below with reference to later figures, the MFA enforcement server may be present at the client device or at the existing service, or as a separate server as shown in FIG. 3. In the example shown in FIG. 3, the user registers for MFA enforcement services at netpeoplesite.com by visiting mfaenforce.com/netpeoplesite. One skilled in the art will understand that any domain relationship may be implemented to allow the user to access MFA enforcement server 220. The mfaenforce.com domain is used simply as an example. The user provides credentials (e.g., username and password) for netpeoplesite.com to MFA enforcement server 220 at 310. The user-provided credentials may include any number or type of credentials recognized by netpeoplesite.com. For example, the credentials may include challenge questions and answers, or any other user-related information known by netpeoplesite.com. MFA enforcement server 220 then queries netpeoplesite.com at 320 to determine if the user-provided credentials correspond to a valid user at netpeoplesite.com. This may be accomplished by logging in to netpeoplesite.com using the user-provided credentials, accessing an application programming interface (API) for netpeoplesite.com, or the like.

At 330, MFA enforcement server 220 asks the user for a new password that the user will provide in the future when authenticating to existing service 120 with MFA enforcement server 220 as an authentication intermediary. This password is referred to herein as "the password known to the user." At 340, the user provides a new password, shown as "orange1" in the example of FIG. 3. After 340, the user has changed the known password from "apple1" to "orange1". In some embodiments, the 330 and 340 are omitted, and the user maintains the same known password.

At 360, MFA enforcement server 220 changes the password used to log in to existing service 120 to a value unknown to the user. This password is referred to herein as "the password unknown to the user." In the example of FIG. 2, MFA enforcement server 220 changes the user's password at existing service 120 to "1superlongpw^25". The password unknown to the user may be set to any value of any length. In some embodiments, the password unknown to the user is randomly generated.

At 370, MFA enforcement server 220 gathers additional registration information from the user. The additional registration information may include any amount or type of information. For example, any necessary account data or metadata may be collected at this time, including data identifying the user, billing data, MFA policy definition data, etc. In some embodiments, the additional registration information includes MFA policy definitions for multiple existing services or multiple users. For example, the registration may be for an administrator account that defines one or more MFA policies for multiple users and/or multiple existing services.

In some embodiments, MFA enforcement server 220 automatically seeks the presence of one or more multifactor tokens. For example, MFA enforcement server 220 may detect the presence of token 212. Example embodiments of token 212 include a secure element (e.g., smartcard chip) embedded in a phone or a microSD card with a secure element. The microSD card may be in a phone, in the USB slot of a PC, or any other client device. In some embodiments, the secure element maybe running identification services or applets. When the presence of a token is detected, MFA enforcement server 220 may record the identity of the token to be included in an MFA policy.

MFA policy definition data collected by MFA enforcement server 220 may also include out-of-band authentication process definitions such as a voice call to enter PIN or SMS with one time number. Any additional multifactor authentication data may be collected at this time.

At the completion of the registration process, MFA enforcement server 220 is established as an authentication intermediary between the user operating client device 210 and existing service 120. The user no longer knows the proper credentials to directly login to existing service 120.

Figure 4:
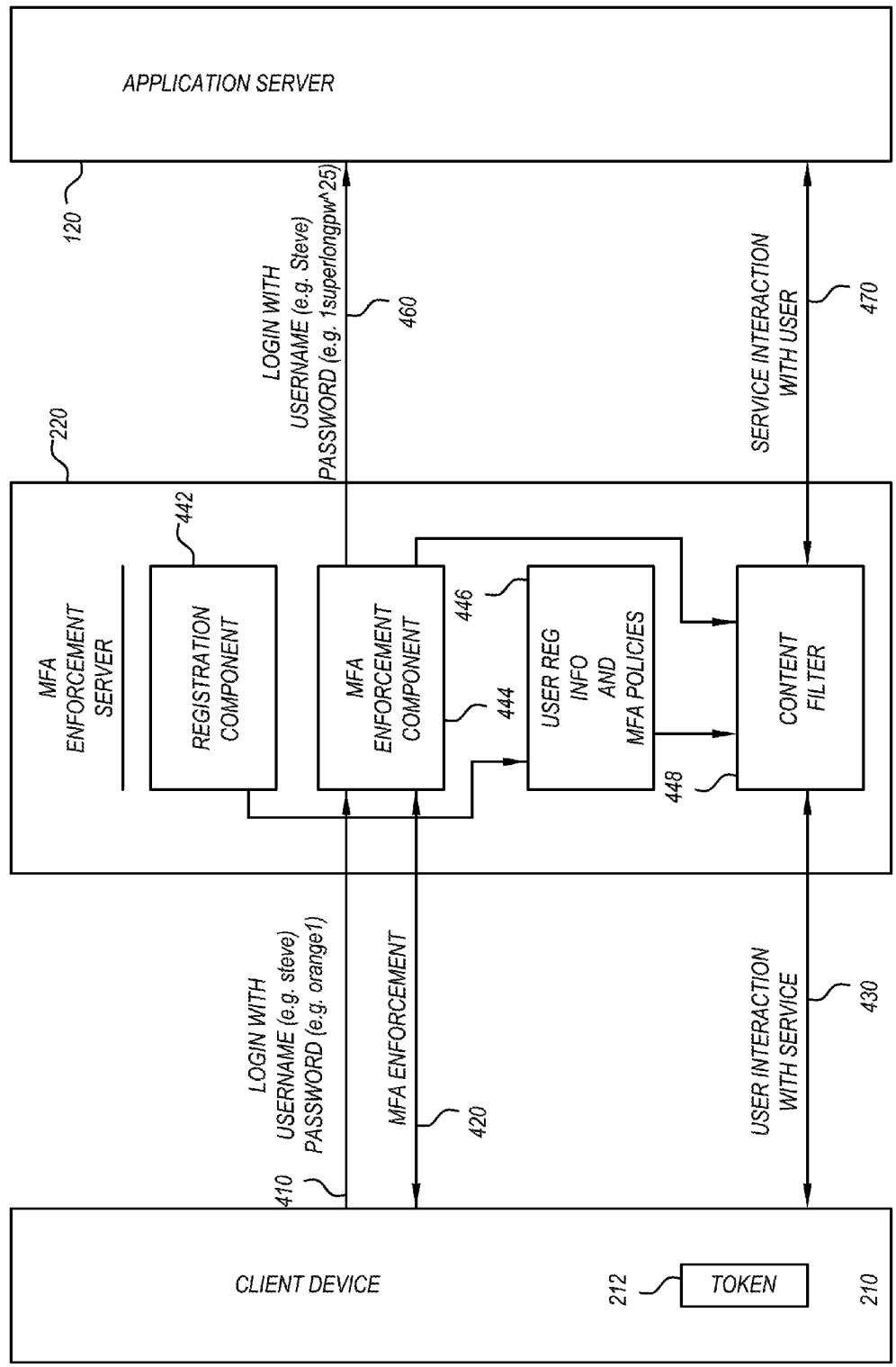
FIG. 4 shows a multifactor authentication server and communication flow during authentication enforcement in accordance with various embodiments of the present invention.

FIG. 4 shows a multifactor authentication server and communication flow during authentication enforcement in accordance with various embodiments of the present invention. MFA enforcement server 220 includes registration component 442, MFA enforcement component 444, secure data store 446, and content filter 448. In some embodiments, MFA enforcement server 220 includes hardware and software components. For example, components 442, 444, and 448 may be implemented as software instructions encoded on a machine-readable medium such as a memory device or disk. When the machine accesses the instructions, a computer or processor performs functions that correspond with the various components shown. Also for example, data store 446 may be a storage device such as memory or a disk. In some embodiments, data store 446 is the machine-readable medium that is encoded with instructions to effect the functionality of the remaining components shown in MFA enforcement server 440.

Registration component 442 is accessed when a user registers for the MFA service (see FIG. 3). Registration information collected by registration component 442 is stored in data store 446. For example, as shown in FIG. 4, registration information collected and stored may include user registration information and one or more MFA policies.

MFA enforcement component 444 functions as an authentication intermediary between a user operating client device 210 and existing service 120. When a registered user wishes to authenticate to a service on existing service 120, the user provides login credentials to MFA enforcement server 220 at 410. In some embodiments, the login credentials provided to MFA enforcement server 220 include the password known to the user. In the example of FIG. 4, the credentials include the user's username "Steve" and the password known to the user "orange1" established as described with reference to FIG. 3.

If the user's credentials sent at 410 correspond to a registered user, MFA enforcement component 444 performs multifactor enforcement at 420. MFA enforcement at 420 is performed in accordance with one or more MFA policies stored at data store 446. For example, if during registration, the user specified that a the physical presence of a token is a factor, then MFA enforcement component 444 will query client device 210 to detect the presence or non-presence of token 212. Further, if an MFA policy specifies an out-of-band communication as a factor, then MFA enforcement component 444 will perform any out-of-band action identified in the MFA policy (e.g., SMS or phone call).

As described above, the MFA policy being enforced may include any number or type of factors. During operation, a user may satisfy all, less than all, or none of the factors specified in the MFA policy beyond the credentials initially provided at 410. Based on the MFA policy and level of user compliance with the MFA enforcement at 420, MFA enforcement component 444 will login to existing service 120 using the credentials established as described above with reference to FIG. 3. In the example of FIG. 4, these credentials include the user's username "Steve", and the password unknown to the user "1superlongpw^25". When the proper credentials are provided at 460, the existing service authenticates MFA enforcement server 220 as the user.

Content filter 448 filters content (430) to and from client device 210, and also filters content (470) to and from existing service 120. The filter rules employed are specified in the MFA policy in effect and may vary based on the level of multifactor authentication satisfaction. For example, an MFA policy may specify that if a user provides correct credentials 410 but fails to provide any further authentication, then read only access may be provided. In this case, content filter 440 allows client device to read but not change content at existing service 120. Also for example, an MFA policy may specify that if a user provides correct credentials 410 but fails to provide any further authentication, then some content on existing service is to be blocked completely. In this case, content filter 440 allows client device to read some but not content at existing service 120.

In some embodiments, content filter 448 may block content and in other embodiments, content filter 448 may substitute content based on the MFA policy in effect and the MFA level satisfied by the user. In some embodiments, content filter 448 is omitted, and MFA enforcement server does not function as a content intermediary.

FIG. 5 shows user information and MFA policy definition data in accordance with various embodiments of the present invention. The information shown in FIG. 5 corresponds to the contents of data store 446 (FIG. 4). In some embodiments, this data is collected during registration. The registration and information collected may be provided by the user(s) to which it refers, or may be performed by an administrator or master account holder with permission over the user(s) account(s).

As shown in FIG. 5, the user information may include account information such as contact and billing information. The user information may also include a token identity, challenge questions, or any other authentication factors corresponding to the user. The user information also includes data specific to applications that are registered. In the example of FIG. 5, the user is registered for two applications, shown as "netpeoplesite.com" and "bankingdebitcredit.com". The domain "bankingdebitcredit.com" is a fictitious name used herein to represent a banking website. One skilled in the art will understand that any number or type of services may be registered in the manner shown for netpeoplesite.com and bankingdebitcredit.com.

For each registered application, the user information includes usernames, passwords (both known and unknown to the user), and MFA policies. Other information may also be stored; the example shown in FIG. 5 is intentionally kept brief for simplicity of explanation.

MFA policy definition data may include, for example, records that define multiple possible MFA factors, levels, and content filtering rules. For example, as shown in FIG. 5, different MFA levels may be defined based on which factors are satisfied by the user. These levels may or may not be hierarchical. Some embodiments include user defined content filter rules (not shown) that are enforced based on the MFA level satisfied during authentication.

MFA policies may also identify restrictions on future access based on the MFA level satisfied during authentication. For example, a user may be restricted access to N number of authentications without validation of a multifactor token. After N authentications, the user may be denied access and/or a master account holder may be informed of such a violation. The master account holder may be able to reset or change the restrictions of the sub-account holders.

MFA policies may also require periodic password changes. For example, the password unknown to the user may be changed periodically without the user's knowledge. Further, the password known to the user may be changed periodically by the user in accordance with an MFA policy.

One skilled in the art will understand that MFA policies are not limited to the data shown in FIG. 5. Any number or type of authentication factors may be utilized, any number of MFA levels may be defined, and any type or amount of content filter may also be defined, without departing from the scope of the present invention.

FIG. 6 shows an MFA enforcement server providing authentication intermediary services for multiple existing services. As described above with reference to FIG. 5, a user may be registered for MFA services with multiple applications (e.g., social networking, banking, etc). As shown in FIG. 6, a user may be authenticated to all of the registered applications upon satisfying a multifactor authentication level.

In the specific example of FIG. 6, a user accesses MFA enforcement server 220 at mfaenfserver.com/username, where "mfaenfserver.com" is a fictitious domain used herein to refer to MFA enforcement server 220, and "username" is a username uniquely pairing the user and MFA enforcement server 220. If, at 620, the user satisfies MFA according to a defined policy, MFA enforcement server authenticates the user to multiple applications 650, 660, 670, also according to a defined MFA policy.

In some embodiments, the multiple applications 650, 660, and 670 correspond to resources on the same existing service. For example, in a corporate environment, applications 650, 660, and 670 may correspond to different application on a corporate network (e.g., email, calendaring, document sharing, remote desktop, etc.). When the user authenticates to MFA enforcement server 220, then MFA enforcement server 220 in turn authenticates to the applications on the corporate network on behalf of the user. Content filtering for each application may then take place based on MFA level as described above.

FIG. 7 shows an MFA token in accordance with various embodiments of the present invention. Token 212 is any physical device that can be associated with a user. When the user has token 212 is possession, and this possession can be verified by a MFA enforcement server, then token 212 can function as one or more authentication factors. In the example of FIG. 7, token 212 includes a "smartcard chip." Smartcard chips are generally well known in the art. They can be found in many current applications, such as subscriber identity modules (SIMs) within cellular phones, near field communications (NFC) capable devices, and others.

Smartcard chip 710 is capable of secure communications. When queried, smartcard chip 710 can provide secure identity information useful for authentication purposes. For example, referring back to FIGS. 2-4, smartcard chip 710 within token 212 can communicate securely with MFA enforcement server 220 during registration as well as during MFA enforcement.

FIGS. 8 and 9 show MFA tokens in use with various client devices. FIG. 8 shows client device 810 and token 212. Client device 810 is shown as a phone and token 212 is shown having a microSD form factor, although these are not limitations of the present invention. For example, client device 810 may be other than a phone (e.g., a media player or tablet computer), and token 212 may have any form factor, including being embedded within client device 810.

When token 212 takes on a memory card form factor as shown in FIG. 8, the token may be available or unavailable as an authentication factor at the wish of the user. For example, a user may have an MFA policy defined that allows a restricted but sufficient level of content access when token 212 is not present. The user may wish to intentionally omit token 212 from client device 810 when full access is not required or desired (e.g., when travelling) to decrease the chance of a data breach in the event client device 810 is lost or stolen. Further, when token 212 is in a portable format such as a memory card, a user may carry the memory card and insert it as necessary into different client devices, depending on the client device available and the level of authentication and content access desired.

FIG. 9 shows client device 910 and token 212. Client device 910 is shown as a laptop computer although this is not a limitation of the present invention.

Further, token 212 is shown as a USB dongle, and this is also not a limitation of the present invention. For example, in some embodiments, token 212 includes a microSD card inserted in a USB carrier. Also for example, in some embodiments, token 212 is embedded in client device 910.

Figure 10:
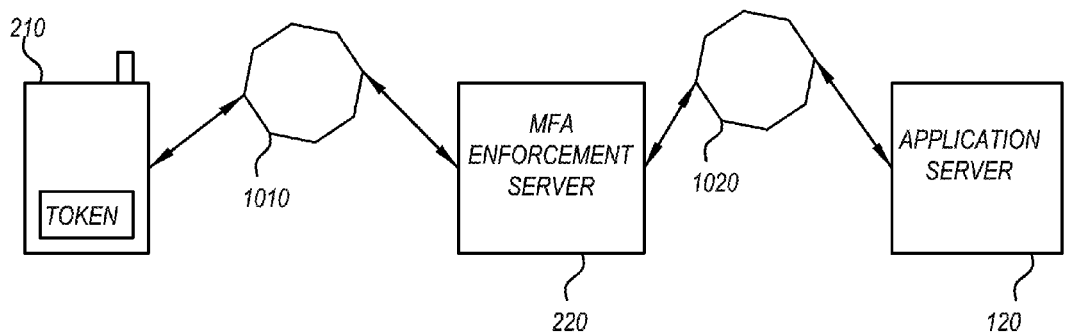
FIG. 10 shows an MFA enforcement server separate from the client device and the existing service.

FIG. 10 shows an MFA enforcement server separate from the client device and the existing service. In embodiments represented by FIG. 10, client device 210 is separate from MFA enforcement server 220, which is in turn separate from existing service 120. Client device 210 communicates with MFA enforcement server 220 over network 1010, and MFA enforcement server 220 communicates with existing service 120 over network 1020.

Networks 1010 and 1020 may include the internet, although this is not a limitation of the present invention. For example, in some embodiments, network 1010 may include the internet, and network 1020 may include a corporate network or a network separated from the internet by a firewall. In these embodiments, an entity that controls existing service 120 may deploy MFA enforcement server 220 to enforce multifactor authentication without being forced to alter the native authentication mechanism of existing service 120.

Also in some embodiments, both networks 1010 and 1020 include elements of the internet. In these embodiments, an entity separate from both the user and the existing service 120 may provide MFA enforcement services. This is consistent with the example domain "mfaenforce.com" as described above.

Figure 11:
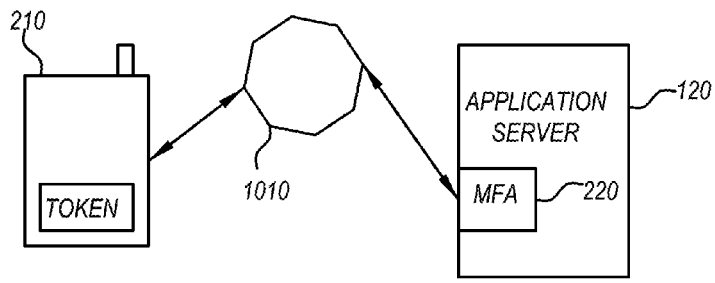
FIG. 11 shows an MFA enforcement server co-located with an existing service.

FIG. 11 shows an MFA enforcement server co-located with an existing service. In embodiments represented by FIG. 11, MFA enforcement server 220 is deployed alongside existing service 120. In these embodiments, the entity controlling existing service 120 can deploy MFA services without being forced to alter the native authentication mechanism of existing service 120. Further, the deployment of MFA enforcement server 220 as a separate service from existing service 120 in these embodiments may be made invisible to users because the users can be forced to register for MFA enforcement when they visit the domain that they have always gone to (e.g., netpeoplesite.com).

Figure 12:
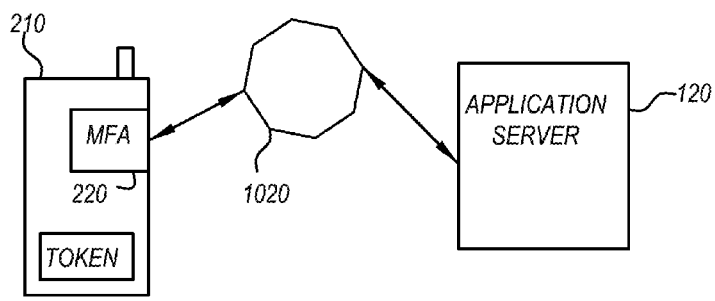
FIG. 12 shows an MFA enforcement server co-located with a client device.

FIG. 12 shows an MFA enforcement server co-located with a client device. In embodiments represented by FIG. 12, MFA enforcement server 220 is deployed on client device 210. For example, MFA enforcement server 220 may include software that performs all of the functions described herein, and may store user information and MFA policies locally on client device 210. In some embodiments, MFA enforcement server 220 includes software components that include instructions stored on a memory card (e.g., token 212 as a microSD card). When token 212 is inserted in client device 210, the MFA enforcement server software may be then be installed on client device 210. In these embodiments, distribution of tokens also serves to distribution of the MFA service.

Figure 13:
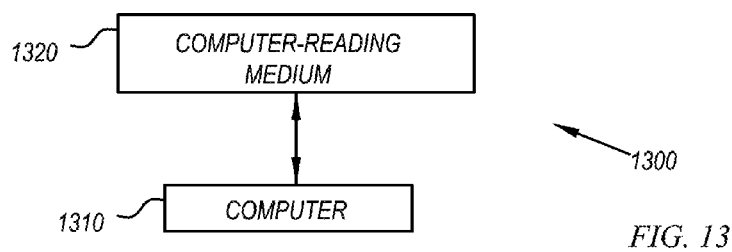
FIG. 13 shows a block diagram of a computing device.

FIG. 13 shows a block diagram of a computing device. Computing device 1300 includes computer 1310 and computer-readable medium 1320. Computing device 1300 represents any of the client devices or servers described above. Computing device 1300 may also represent token 212. Computer 1310 may include any type of processor, including a processor in a smartcard chip or a processor in a client device such as a phone or laptop computer. Computer-readable medium 1320 represents any storage medium capable of storing instructions that when accessed cause computer 1310 to perform method embodiments of the present invention. For example, computer-readable medium 1320 may store instructions that when accessed cause computer 1310 to perform the functions of one or more of registration component 442, MFA enforcement component 444, and content filtering component 448 (FIG. 4). Example types of storage medium include volatile memory, nonvolatile memory, optical storage and magnetic storage.

Figure 14:
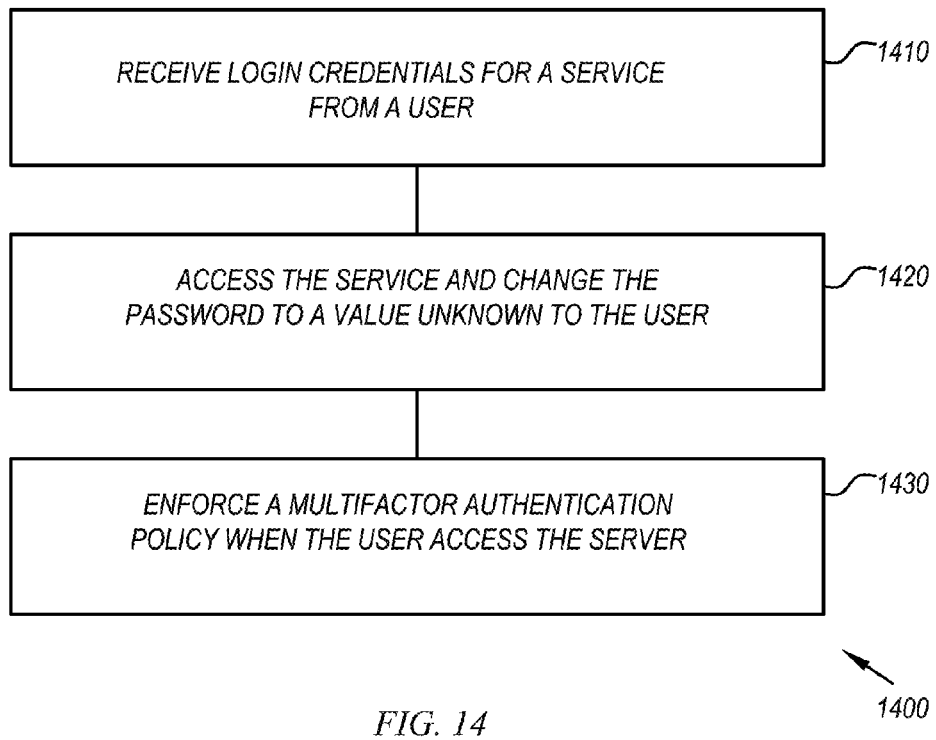
FIGS. 14 and 15 show flowcharts of methods in accordance with various embodiments of the present invention.
Figure 15:
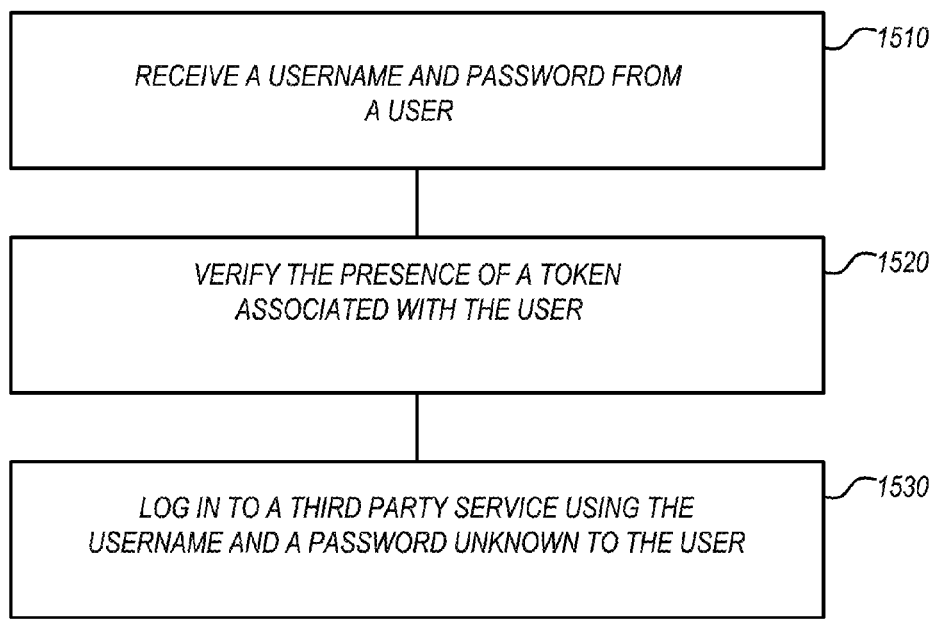

FIGS. 14 and 15 show flowcharts of methods in accordance with various embodiments of the present invention. Diagrams 1400 and 1500 represent data flow and actions that may be performed by an MFA enforcement server, such as MFA enforcement server 220. The various actions represented in FIG. 2 may be performed by an MFA enforcement server that is local to a client device, local to an existing service, or remote from both the client device and existing service. (See FIGS. 10-12). The actions shown in diagrams 1400 and 1500 may be performed in the order shown or in a different order. Further, in some embodiments, some actions are omitted entirely.

Referring now to FIG. 14, login credentials for a service are received from a user. The service corresponds to any of the existing services described herein. For example, the login credentials may include a username and password for a social networking site, a banking site, a corporate network, or any other service requiring authentication. At 1420, the service is accessed and the password is changed to a value unknown to the user. In the example of FIGS. 3-4, the password unknown to the user corresponds to "1superlongpw^25". At the completion of 1410, and 1420, the user no longer has the knowledge (new password) needed to directly login into the service.

At 1430, an MFA policy is enforced when the user accesses the service. In some embodiments, the MFA policy was defined when the user registered for the service. The MFA policy may require that any number or type of authentication factor be satisfied, and may also device MFA levels based on how many factors can be satisfied. For example, in some embodiments, the MFA policy requires that the physical presence of a token be verified. In some embodiments, the presence of the token can be verified by communicating with a secure element within the token. The token may take on any form factor, including an embedded secure element in a phone or computer, a secure element in a memory card, or the like. In some embodiments, the token takes on the form factor of a microSD memory card.

Depending on the outcome of multifactor authentication, the MFA enforcement server logs in to the existing service on behalf of the user, and may also filter content.

Referring now to FIG. 15, at 1510, a username and password are received from a user. At 1520, the presence of a token associated with the user is verified. At 1530, the MFA enforcement server logs in to the existing service using the username provided and a password unknown to the user.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method performed by a multifactor authentication enforcement server comprising:
   receiving login credentials for a plurality of services from a user of a client device, the login credentials including passwords known to the user;
   accessing each of the plurality of services and changing the passwords to new passwords unknown to the user;
   registering a plurality of authentication factors for use by the user to login to the multifactor authentication enforcement server, wherein at least one of the plurality of authentication factors includes verification of a smartcard chip embedded in the client device;
   logging in to the services using the passwords unknown to the user when the user logs in to the multifactor enforcement server;
   receiving access to content provided by the plurality of services;
   enforcing multifactor authentication policies for each of the plurality of services, wherein the multifactor authentication policies filter content provided by the plurality of services if less than all of the plurality of authentication factors are satisfied.

2. The method of claim 1 wherein at least one of the plurality of authentication factors includes a password.

3. The method of claim 1 wherein at least one of the plurality of authentication factors includes a challenge question.

4. The method of claim 1 wherein the multifactor authentication policies filter content bidirectionally.

5. The method of claim 1 wherein the method is performed by a web-based entity separate from the client device and the plurality of services.

6. The method of claim 1 wherein the client device comprises a mobile phone.

7. The method of claim 1 wherein the client device comprises a laptop computer.

8. The method of claim 1 wherein the client device comprises a tablet computer.

9. A multifactor authentication enforcement server to provide multifactor authentication services, the multifactor authentication enforcement server including a computer-program product embodied on a non-transitory computer-readable medium, the computer-program product comprising:
   a registration component to respond to a user's registration request, the registration component being operable to receive usernames, passwords, and multifactor authentication policies including a plurality of authentication factors for a plurality of existing services from the user and to modify the passwords at the plurality of existing services to values unknown to the user, wherein the plurality of authentication factors include verification of a smartcard chip embedded in a client device;
   a multifactor authentication enforcement component operable to allow the user to log in to the multifactor enforcement server, and to log in to the plurality of existing services using the passwords unknown to the user; and
   a content filter component to receive content provided by the plurality of services and to filter the content provided by the plurality of services if less than all of the plurality of authentication factors are satisfied.

10. The server of claim 9 further comprising a database component operable to map authentication levels to available content of the plurality of existing services.

11. The server of claim 10 wherein the authentication levels are least partially dependent on the existence of the smartcard chip embedded in the client device.

12. The server of claim 9 wherein verification of a smartcard chip embedded in a client device comprises verification of a secure element in a mobile phone.

13. The server of claim 9 wherein verification of a smartcard chip embedded in a client device comprises verification of a secure element in a laptop computer.

14. The server of claim 9 wherein verification of a smartcard chip embedded in a client device comprises verification of a secure element in a tablet computer.

15. A non-transitory computer-readable medium having instructions stored thereon that when accessed result in a multifactor authentication enforcement server performing a method comprising:
   receiving usernames for a plurality of existing services from a user;
   receiving passwords for the plurality of existing services from the user;
   verifying a presence or an absence of a smartcard chip associated with a client device;
   receiving from the user multifactor authentication policies corresponding to the plurality of existing services, wherein the multifactor authentication policies include detection of the smartcard chip associated with the client device;
   accessing each of the plurality of existing services and changing the passwords to new passwords unknown to the user;
   logging into the plurality of existing services using the passwords unknown to the user when the user logs in to the multifactor authentication enforcement server;
   receiving access to content provided by the plurality of existing services; and
   enforcing the multifactor authentication policies wherein the absence of the smartcard chip results in the multifactor authentication enforcement server filtering the content provided by the plurality of existing services.

16. The computer-readable medium of claim 15 wherein verifying the presence of a smartcard chip associated with a client device comprises verifying the presence of a secure element in a mobile phone.

17. The computer-readable medium of claim 15 wherein verifying the presence of a smartcard chip associated with a client device comprises verifying the presence of a secure element in a laptop computer.

18. The computer-readable medium of claim 15 wherein verifying the presence of a smartcard chip in a client device comprises verifying the presence of a secure element in a tablet computer.

* * * * *